(12) United States Patent
Gerhard et al.

(10) Patent No.: US 6,688,166 B2
(45) Date of Patent: Feb. 10, 2004

(54) METHOD AND DEVICE FOR CONTROLLING AN INTERNAL COMBUSTION ENGINE

(75) Inventors: Engel Gerhard, Stuttgart (DE); Frank Meier, Kornwestheim (DE); Thomas Bleile, Stuttgart (DE); Peter Rupp, Remseck (DE); Wolfgang Kraemer, Ingolstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/018,498

(22) PCT Filed: Mar. 23, 2001

(86) PCT No.: PCT/DE01/01118
§ 371 (c)(1),
(2), (4) Date: May 14, 2002

(87) PCT Pub. No.: WO01/77509
PCT Pub. Date: Oct. 18, 2001

(65) Prior Publication Data
US 2002/0179060 A1 Dec. 5, 2002

(30) Foreign Application Priority Data
Apr. 6, 2000 (DE) .......................................... 100 17 280

(51) Int. Cl.$^7$ ............................................. G01M 15/00
(52) U.S. Cl. ...................................... 73/118.2; 701/101
(58) Field of Search ........................ 73/112, 116, 117.2, 73/117.3, 118.1, 118.2, 119 R; 701/99, 101, 102, 103, 106, 109

(56) References Cited

U.S. PATENT DOCUMENTS

| | | | | | |
|---|---|---|---|---|---|
| 5,889,205 A | * | 3/1999 | Treinies et al. | ............ | 73/118.2 |
| 5,974,870 A | * | 11/1999 | Treinies et al. | ............ | 73/118.2 |
| 6,371,086 B1 | * | 4/2002 | Matsubara et al. | ......... | 123/500 |
| 2002/0014103 A1 | * | 2/2002 | Matsubara et al. | .......... | 73/1.06 |
| 2002/0029768 A1 | * | 3/2002 | Matsubara et al. | .......... | 123/500 |

FOREIGN PATENT DOCUMENTS

| | | |
|---|---|---|
| DE | 197 56 619 | 10/1998 |
| DE | 198 30 300 | 1/2000 |
| EP | 0 845 586 | 6/1998 |
| EP | 1 024 275 | 8/2000 |
| WO | 97/35106 | 9/1997 |

\* cited by examiner

*Primary Examiner*—Eric S. McCall
(74) *Attorney, Agent, or Firm*—Kenyon & Kenyon

(57) ABSTRACT

A method and device are for controlling an internal combustion engine. Using at least one model, an oxygen quantity flowing into the internal combustion engine is determined on the basis of at least one manipulated variable and at least one measured variable which characterizes the condition of the air in an intake manifold. The oxygen quantity is determined on the basis of at least one temperature variable, one pressure variable, one speed variable, one fuel-quantity variable and one air variable.

10 Claims, 2 Drawing Sheets

METHOD AND DEVICE FOR CONTROLLING AN INTERNAL COMBUSTION ENGINE

FIELD OF THE INVENTION

The present invention relates to a method and a device for controlling an internal combustion engine.

BACKGROUND INFORMATION

A method and device for controlling an internal combustion engine are described, for example, in German Published Patent Application No. 197 56 619. A system is described for operating an internal combustion engine, particularly in a motor vehicle, in which the air is supplied to a combustion chamber via a throttle valve arranged in an intake manifold, the quantity flow via the throttle valve being determined. At the same time, a valve is disposed in an exhaust-gas recirculation line, and the quantity flow via the valve in the exhaust-gas recirculation line is determined. The air-quantity flow into the combustion chamber is determined on the basis of the two air-quantity flows. A problem with this device is that different variables needed for the calculation can only be acquired with difficulty using sensors. Therefore, it is disadvantageous that a large number of sensors are necessary for detecting the different variables.

SUMMARY

The procedure of the present invention makes it possible to determine the oxygen quantity flowing into the internal combustion engine. In so doing, only a few measured variables may be necessary which are easily detectable using simple, inexpensive sensors. Furthermore, variables are used which are present internally in the control unit for controlling the internal combustion engine. At least one speed variable (N), which characterizes the speed of the internal combustion engine, one charge-air temperature (T2), which characterizes the temperature in the intake manifold, and/or a charge-air pressure (P2), which characterizes the pressure in the intake manifold, is used as a measured variable.

DETAILED DESCRIPTION

Figure 1:
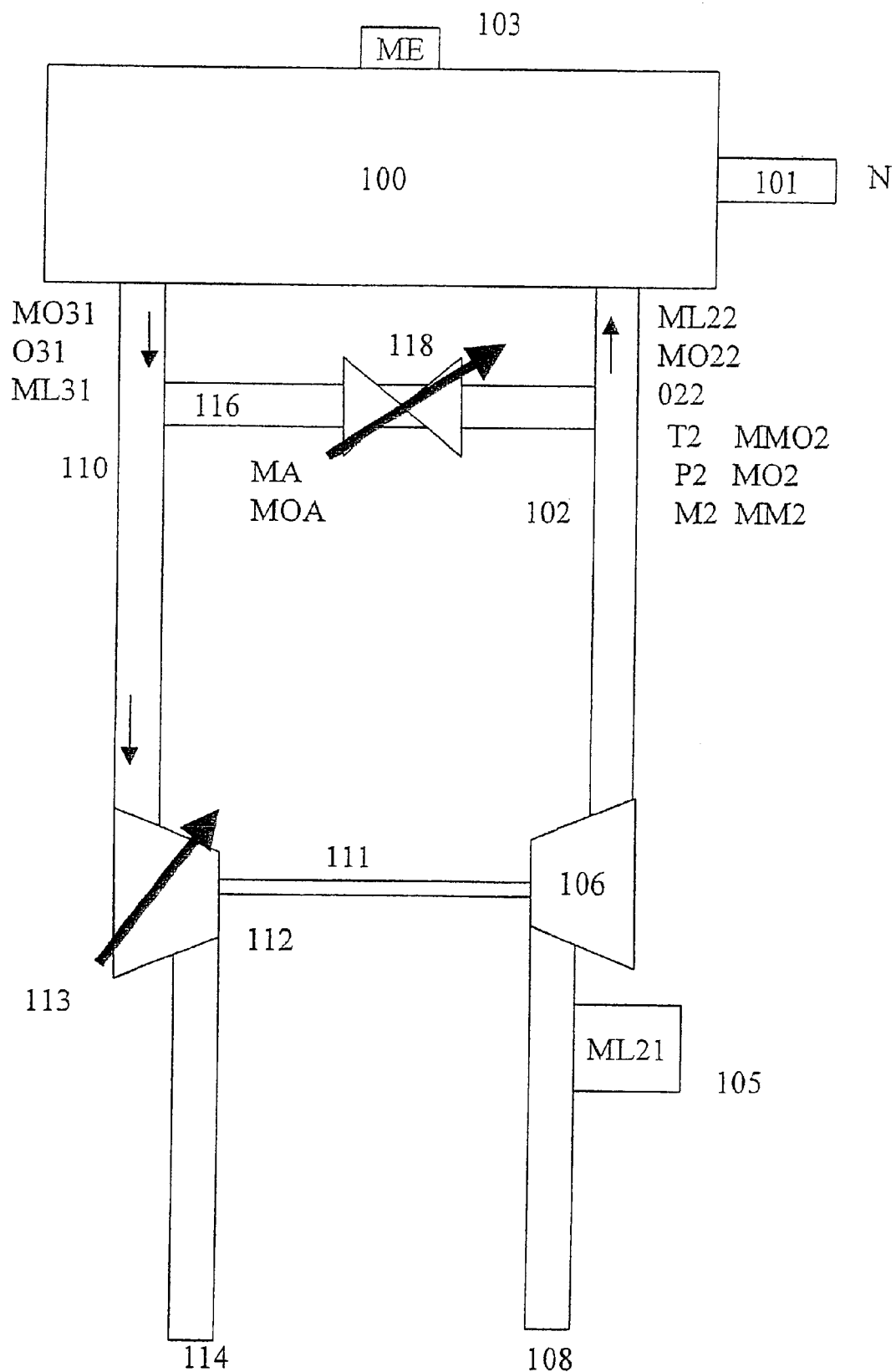
FIG. 1 is a schematic view of the internal combustion engine together with the air system.

In the following, the procedure of the present invention is described using a diesel internal combustion engine as an example. However, the invention is not restricted to use in diesel internal combustion engines. It may also be used for other internal combustion engines, e.g., direct-injection gasoline internal combustion engines.

A certain air quantity ML22 containing a specific oxygen portion MO22 is supplied to an internal combustion engine 100 via a high-pressure fresh-air line 102. The variable MO22 is also designated as the oxygen portion prior to combustion. The air in high-pressure fresh-air line 102 has a temperature T2 and a pressure P2.

The ambient air arrives at an air compressor 106 via a low-pressure fresh-air line 108, and flows into high-pressure fresh-air line 102. High-pressure fresh-air line 102 is also designated as the intake manifold. Air quantity ML21 having oxygen portion MO21 flows via the air compressor into high-pressure fresh-air line 102. Air quantity ML21 having oxygen portion MO21 which flows through low-pressure fresh-air line 108 corresponds to the air quantity having the corresponding oxygen portion which flows through air compressor 106. Air quantity ML21, which flows from outside into the intake manifold is measured by an air-flow sensor 105.

Air quantity ML31 having oxygen portion MO31 flows from internal combustion engine 100 into a high-pressure exhaust line 110. Quantity MO31 is also designated as the oxygen portion after combustion.

The exhaust gases travel from high-pressure exhaust line 110 via a turbine 112 into a low-pressure exhaust line 114, also known as exhaust pipe 114.

Turbine 112 drives air compressor 106 via a shaft 111. The efficiency of the turbine 112, and thus of the entire supercharger, may be influenced by a supercharger controller 113. The procedure may also be used for internal combustion engines without a supercharger.

A connection, designated as 116, exists between high-pressure exhaust line 110 and high-pressure fresh-air line 102. Air quantity MA containing oxygen portion MOA flows through this exhaust-gas recirculation line 116. The cross-section of exhaust-gas recirculation line 116 may be controllable by an exhaust-gas recirculation valve 118.

Speed N at the crankshaft and/or the camshaft of the internal combustion engine may be detected by a speed sensor 101. In addition, fuel-quantity positioners 103 are provided which determine fuel quantity ME to be injected that is supplied to the internal combustion engine. To that end, positioners 103 receive a quantity signal ME.

For precise control of the internal combustion engine, i.e., control elements 118 and 113, various quantities indicated should be known. In particular, the oxygen quantity, i.e., the oxygen portion MO22, supplied to the internal combustion engine should be known. The oxygen quantity, together with injected fuel quantity ME, determines the exhaust emissions, particularly the soot emissions in the case of diesel internal combustion engines.

Air masses may be processed using the procedure of the present invention. However, volume variables may also be processed. The variables may be designated as quantity variables. The variables described represent only one example embodiment. Instead of the variables described, other variables which correspond to the described variables and/or are connected to them via conversion factors may also be used.

Figure 2:
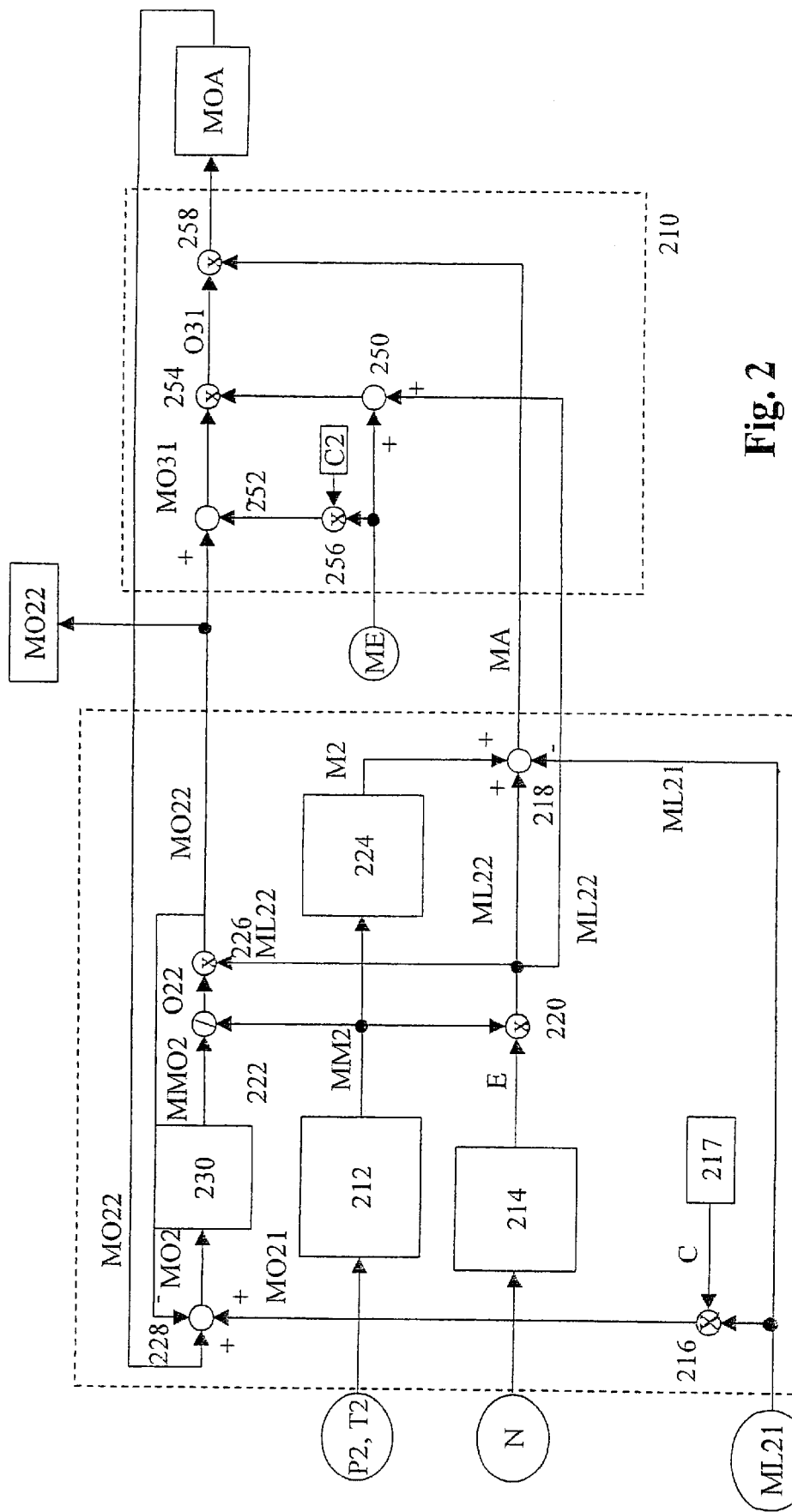
FIG. 2 is a schematic view of a model for determining the oxygen quantity flowing into the internal combustion engine.

FIG. 2 illustrates the model for the intake manifold and the combustion. The model for the intake manifold is designated 200, and the model for the combustion is designated 210. Different, easily measurable variables are acquired by various sensors which are shown with circles. They are charge-air pressure P2, which characterizes the pressure in the intake manifold, charge-air temperature T2, which characterizes the temperature of the air in intake manifold 102, speed N of the internal combustion engine, fresh-air quantity ML21, which flows from outside into intake manifold 102, and fuel quantity ME to be injected. Fuel quantity ME to be injected may be the fuel quantity to be injected or the fuel quantity injected, or a variable characterizing this fuel quantity such as the triggering duration of injectors and/or injection valves. Speed signal N is available to the engine management since it is used for controlling the internal combustion engine.

Charge-air pressure P2 and charge-air temperature T2 arrive at an air-quantity determination 212. The speed arrives at a degree-of-admission 214, and air quantity ML21 arrives at node 216 and with a negative preceding sign at node 218. Output signal MM2 of air-quantity determination 212, which corresponds to the air quantity in the intake manifold, arrives at node 220, at node 222 and at differentiator 224.

Output signal M2 of differentiator 224 characterizes the change of the air quantity in the intake manifold as a function of time. This signal M2 arrives with a positive preceding sign at summing point 218.

Output signal E of degree-of-admission determination 214 likewise arrives at node 220. Output signal ML22 of node 220 characterizes the air quantity which flows into the internal combustion engine. This signal ML22 arrives with a positive preceding sign at the input of node 218, and at node 226. In addition, this signal ML22 with respect to the air quantity flowing into the internal combustion engine arrives at node 250 of combustion model 210.

An output signal C of a constant setpoint selection 217 is applied at a second input of node 216. The output signal MO21 of node 216, which corresponds to the oxygen quantity that flows into intake manifold 102, arrives at node 228. A signal MOA, which characterizes the oxygen quantity flowing in the exhaust-gas recirculation line, is applied at a second input of node 228. The signal MOA is provided by combustion model 210. Output signal MO2 of node 228, which characterizes the change of the oxygen quantity in intake manifold 102, arrives at an integrator 230, the output of which is signal MM02, which characterizes the oxygen quantity in the intake manifold.

The signal MM02 with respect to the oxygen quantity in the intake manifold arrives as a second variable at node 222. Output signal O22 of node 222, which characterizes the oxygen portion in the air flowing into the internal combustion engine, arrives at node 226. Signal MO22, which characterizes the oxygen quantity flowing into the internal combustion engine, is present at the output of node 226. Signal MO22 arrives with a negative preceding sign at node 228, and with a positive preceding sign at node 252 of combustion model 210. Output signal MO31 of node 252, which corresponds to the oxygen quantity flowing out of the internal combustion engine, arrives at node 254, at the second input of which the output signal of node 250 is applied. Fuel-quantity signal ME is applied at a second input of node 250. Fuel-quantity signal ME also arrives, via node 256, with a negative preceding sign at node 252. The signal is combined with a constant C2 in node 256. Output signal O31 of node 254, which corresponds to the oxygen portion in the air flowing out of the internal combustion engine, arrives, via node 258, at the output of combustion model 210. Output signal MA, which characterizes the air quantity in the exhaust-gas recirculation line, of node 218 is applied at a second input of node 256.

Air-quantity determination 212 calculates total air quantity MM2 in the intake manifold with the aid of the ideal gas equation from charge-air pressure P2, charge-air temperature T2 and volume V to the intake manifold. In this context, the volume is regarded as a constant. The air quantity MM2 in the intake manifold is differentiated by way of differentiator 224 that may be configured as a DT1 component. The change of air quantity M2 in the intake manifold as a function of time is thus yielded.

Air quantity ML22, which is flowing into the internal combustion engine, is proportional to the density of the gas in the intake manifold, and therefore proportional to air quantity MM2. Proportionality factor E is predefined as a characteristic curve by degree-of-admission determination 214 as a function of instantaneous engine speed N.

From the air quantity ML21, measured with the aid of air-flow sensor 105, estimated air quantities ML22 which are flowing into the internal combustion engine, and the change of air quantity M2 in the intake manifold, node 218 calculates an estimate for air quantity MA which is flowing through the exhaust-gas recirculation line. As a result, the air quantity in the intake manifold is balanced.

In addition to total air quantity MM2 in the intake manifold, oxygen quantity MMO2 contained therein is also estimated. To that end, oxygen-quantity flow MO2 is integrated. The oxygen-quantity flow is composed of three components. The first component is oxygen quantity MO21 flowing in via air-flow sensor 105. The oxygen quantity MO21 is proportional to air quantity ML21 flowing via the air-flow sensor. Proportionality constant C corresponds to the oxygen content of the fresh air. The second component of sought oxygen quantity MO22 which is flowing into the internal combustion engine is proportional to air quantity ML22 flowing into the internal combustion engine. Proportionality constant O22 corresponds to the oxygen portion of the air flowing into the internal combustion engine. Variable O22 is yielded as the quotient of oxygen quantity MMO2 and air quantity MM2. Since the oxygen-quantity flow into the internal combustion engine takes oxygen from the intake manifold, this portion is taken into account with a negative preceding sign. The third component is oxygen quantity MOA which enters into the intake manifold via the exhaust-gas recirculation valve. The oxygen-quantity flow is proportional to air quantity MA which is flowing through the exhaust-gas recirculation line. The proportionality constant is oxygen portion O31 in the air which is flowing out of the internal combustion engine.

The combustion model is used to determine the oxygen portion O31 in the air flowing out of the internal combustion engine. The model starts from the assumption that the entire injected fuel quantity burns, and in so doing, withdraws oxygen from the gas mixture in the combustion chamber, oxygen quantity MO22 prior to combustion thereby being reduced to oxygen quantity MO31 after combustion. Fuel quantity and reduction of the oxygen quantity are proportional to one another on the basis of the stoichiometric relationship C2.

Oxygen portion O31 after combustion is derived as the quotient of oxygen quantity MO31 and the total air quantity which flows out of the internal combustion engine. The air quantity flowing out of the internal combustion engine is yielded as the sum of air quantity ML22 which flows into the internal combustion engine and injected fuel quantity ME.

Oxygen quantity MO22 flowing into the internal combustion engine is determined, using the procedure described, from variables that are easy to measure, the effects of the exhaust-gas recirculation and the oxygen portion in the exhaust gas being taken into account. This may be considerable in the case of lean-operated internal combustion engines, particularly diesel engines.

According to the present invention, oxygen quantity MO22 flowing into the internal combustion engine is determined on the basis of at least one temperature variable T2, one pressure variable P2, one speed N, one fuel quantity ME and one air quantity ML21. Temperature variable T2 characterizes the temperature of the air in the intake manifold. Pressure variable P2 characterizes the pressure of the air in the intake manifold.

Air quantity MA flowing through an exhaust-gas recirculation line is ascertained by balancing the air quantity in the intake manifold. Oxygen quantity MMO2 in the intake manifold is determined on the basis of at least oxygen quantity MO21, which flows from outside into the intake manifold, oxygen quantity MO22, which flows into the internal combustion engine, and an oxygen quantity MOA, which flows via the exhaust-gas recirculation line. In this context, the oxygen quantities are in each case determined from the corresponding air quantity and the respective oxygen portion.

The oxygen portions of the air quantities flowing from outside into the intake manifold are the constant C. Oxygen portion O31 of the air quantity flowing via the exhaust-gas recirculation line is determined using a combustion model. Oxygen portion O22 of the air quantity which flows into the internal combustion engine is calculated from oxygen quantity MMO2 in the intake manifold and the air quantity in the intake manifold.

Oxygen quantity MO22 flowing into the internal combustion engine is determined at least on the basis of oxygen quantity MMO2 in the intake manifold, air quantity MM2 in the intake manifold, and air quantity ML22 which flows into the internal combustion engine. Air quantity ML22 flowing into the internal combustion engine is determined at least on the basis of air quantity MM2 in the intake manifold and speed N.

Air quantity MM2 in the intake manifold is determined at least on the basis of temperature variable T2 and pressure variable P2.

What is claimed is:

1. A method for controlling an internal combustion engine, comprising the step of:
   determining an oxygen quantity flowing into the internal combustion engine using at least one model on the basis of at least one manipulated variable and at least one of measured variables, the measured variables including a fuel-quantity variable, a speed variable and variables characterizing a condition of air in an intake manifold, wherein the variables characterizing a condition of air in the intake manifold include a temperature variable, a pressure variable, and an air variable.

2. The method according to claim 1, further comprising the step of acquiring by sensors the temperature variable, which characterizes a temperature of the air in the intake manifold, the pressure variable, which characterizes a pressure of the air in the intake manifold, and the air variable, which characterizes an air quantity flowing from outside into the intake manifold.

3. The method according to claim 1, further comprising the step of ascertaining an air quantity flowing through an exhaust-gas recirculation line by balancing an air quantity in the intake manifold.

4. The method according to claim 3, further comprising the step of determining an oxygen quantity in the intake manifold on the basis of at least one oxygen quantity that flows from outside into the intake manifold, the oxygen quantity that flows into the internal combustion engine and an oxygen quantity that flows via the exhaust-gas recirculation line.

5. The method according to claim 4, further comprising the step of determining each of the oxygen quantity that flows from outside into the intake manifold, the oxygen quantity that flows into the internal combustion engine and the oxygen quantity that flows via the exhaust-gas recirculation line from a corresponding air quantity and a respective oxygen portion.

6. The method according to claim 4, further comprising the step of determining an oxygen portion of an air quantity flowing via the exhaust-gas recirculation line using a combustion model.

7. The method according to claim 1, wherein the oxygen quantity flowing into the internal combustion engine is determined in the determining step on the basis of at least an oxygen quantity in the intake manifold, an air quantity in the intake manifold and an air quantity that flows into the internal combustion engine.

8. The method according to claim 7, further comprising the step of determining the air quantity flowing into the internal combustion engine on the basis of the air quantity in the intake manifold and the speed variable.

9. The method according to claim 7, further comprising the step of determining the air quantity in the intake manifold on the basis of at least the temperature variable and the pressure variable.

10. A device configured to control an internal combustion engine, comprising:
    an arrangement configured to determine an oxygen quantity flowing into the internal combustion engine using at least one model on the basis of at least one manipulated variable and at least one of measured variables, the measured variables including a fuel-quantity variable, a speed variable and variables characterizing a condition of air in an intake manifold, wherein the variables characterizing a condition of air in the intake manifold include a temperature variable, a pressure variable, and an air variable.

* * * * *